Patented Aug. 14, 1945

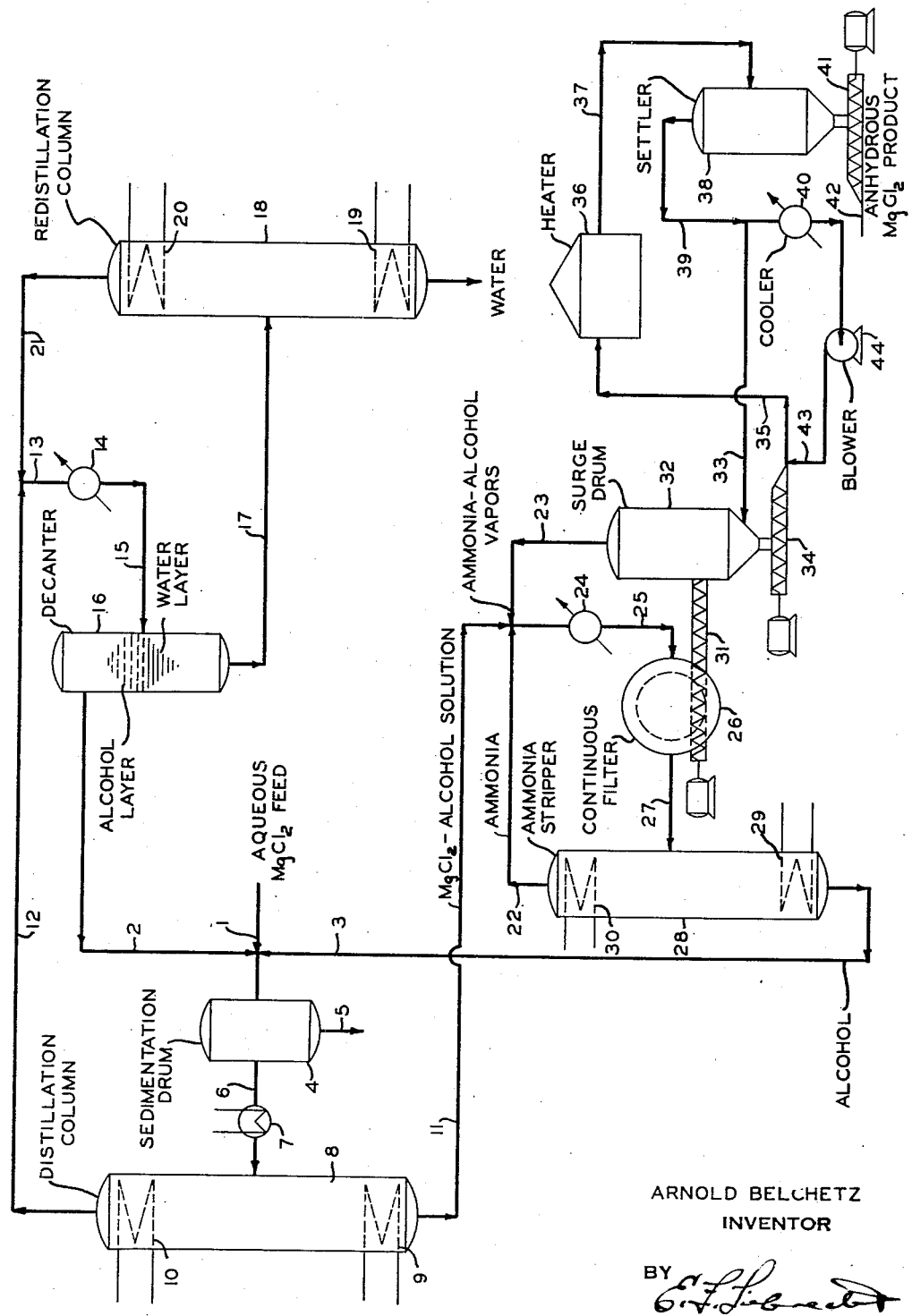

2,381,995

UNITED STATES PATENT OFFICE 2,381,995

PRODUCTION OF ANHYDROUS MAGNESIUM CHLORIDE

Arnold Belchetz, Kew Gardens, N. Y., assignor to The M. W. Kellogg Company, Jersey City, N. J., a corporation of Delaware Application May 29, 1942, Serial No. 444,981

8 Claims. (Cl. 23—91)

This application is a continuation-in-part of my co-pending application S. N. 419,987, filed November 21, 1941.

In my earlier application I have described a commercially practical method of preparing a pure anhydrous salt that is particularly adapted for the preparation of pure anhydrous magnesium chloride ($MgCl_2$), which involves heating a hydrated form of $MgCl_2$ with a volatile non-aqueous liquid in which anhydrous $MgCl_2$ is soluble, distilling off water with vapors of the liquid and leaving a non-aqueous solution of $MgCl_2$ as the distillation residue. Separation of solid anhydrous $MgCl_2$ from the non-aqueous solution thereafter is accomplished by completely vaporizing the solvent. My present invention provides an alternative method of recovering dehydrated $MgCl_2$ from such non-aqueous solutions. This method therefore, in its preferred embodiment, embraces my described process of heating a hydrous form of $MgCl_2$ with a volatile non-aqueous liquid, distilling off water with vapors of the non-aqueous liquid and leaving an anhydrous non-aqueous solution of $MgCl_2$ as the distillation residue and includes the step whereby anhydrous $MgCl_2$ then is separated from its solution in the non-aqueous solvent by the addition of a precipitating agent which forms a solid complex with the $MgCl_2$ that is insoluble in the non-aqueous liquid. The solid $MgCl_2$ complex readily is separated from its association with liquid by filtration and the anhydrous $MgCl_2$ then is recovered in a state of highest purity by dissociating the solid complex with a heat treatment.

The non-aqueous solvents which I prefer to use in practising my invention are the saturated mono-hydroxy aliphatic alcohols and more specifically those alcohols of the latter type having atmospheric boiling points between 220° and about 350° F. In the following further description of an exemplary embodiment of the invention with reference to the annexed drawing the use of such an alcohol will be assumed. As will be understood by those skilled in the art, however, other solvents can be used. I particularly prefer the amyl alcohols or pentanols as solvents. Hexyl alcohols can be used but because of their generally higher cost are not conducive to an economical operation. Exemplary operating conditions are given for the use of isoamyl alcohol in the specific embodiment of the invention hereinafter described. The significant properties of isoamyl alcohol are as follows:

1. Its boiling point is 267° F.
2. It forms a constant boiling mixture with water consisting of about 58% alcohol and about 42% water, and having a boiling point of 203° F.
3. It dissolves water to the extent of about 10% by weight at 100° F.
4. It is soluble in water to the extent of about 2% by weight at 100° F.
5. It will dissolve upwards of 16% by weight of $MgCl_2$ at its boiling point.

The precipitating agent which I prefer to use for separating the $MgCl_2$ from the non-aqueous liquid is anhydrous ammonia. I prefer further to use anhydrous ammonia in the vapor phase since its use in this phase permits the process of my invention to be carried out in a system not requiring refrigeration and under condition more suitable and more conducive to an economical operation, as will become apparent in the following description.

The annexed drawing is a diagrammatic flow arrangement of an exemplary embodiment of the invention wherein items of equipment are conventionally shown and from which self-evident necessaries, such as pumps, valves and the like have been omitted for greater clarity. It is understood that reference to the drawing is by way of example only as the invention is capable of other embodiments and is not to be restricted to the physical limitations of the apparatus indicated in the drawing.

The operating step first to be described is essentially a distillation step and could, if desired, be carried out as a batch operation. For greatest efficiency, however, it is preferable to employ continuous fractionating equipment and to supply the feed in the form of a hot aqueous solution of $MgCl_2$ containing the minimum amount of water; that is, to supply $MgCl_2.6H_2O$ dissolved in little more than its own water of crystallization. Such a solution may be obtained from a more dilute one by conventional vaporization methods or in other ways depending upon the original source of the $MgCl_2$.

In the drawing an aqueous $MgCl_2$ solution is taken from any available source and introduced into line 1. An alcohol-water mixture derived from a subsequent step of the process is introduced into line 1 through line 2, and anhydrous alcohol derived from still another step of the process is introduced into line 1 through line 3. The $MgCl_2$, water and alcohol solution thus formed in line 1 is passed into a sedimentation drum 4 wherein any salts such as sodium chloride, sodium sulphate, potassium chloride, etc., which may have been present as impurities derived in the initial $MgCl_2$ solution, are precipitated and settled out by reason of their insolubility in dilute alcohol. Sediment is periodically drawn off as it may accumulate in this drum, by means of line 5 and rejected from the process as waste. If desired, the small amount of alcohol accompanying the withdrawn slurry is recovered by vaporization and returned to the process. It will be seen that my method of preparing pure anhydrous $MgCl_2$ has the advantage initially of accomplishing the removal of soluble salts such as are likely to be associated with $MgCl_2$ obtained by fractional crystallization of brines. In fact, when the source of $MgCl_2$ is a mixture of dissolved salts, little or no purification thereof prior to dehydration may be required other than that provided by the above-mentioned precipitation. The sedimentation drum 4 is alternatively replaced by a filter, if desired.

The $MgCl_2$-water-alcohol solution from which insoluble impurities have been removed, is passed through line 6 to a preheater 7 wherein it is heated preferably to its boiling point. It is then introduced into an intermediate section of a distillation column 8. The latter can be of conventional design, embodying fractionating bubble trays, baffles, packing or the like. A reboiler coil 9 is situated in the base of column 8 to maintain a bottom temperature of approximately 267° F. The bottom temperature will, however, because of the boiling point raising effect of the dissolved $MgCl_2$ with alcohol be somewhat higher than 267° F. and the exact temperature will depend upon how nearly saturated a solution is withdrawn from the bottom of the column. A water cooled reflux condenser 10 is located at the top of column 8 to maintain a temperature which in the present instances should be 203° F.

In column 8 the feed material is fractionated into absolute isoamyl alcohol as the higher boiling bottom product and a constant-boiling mixture of water and isoamyl alcohol as the lower boiling top product. The $MgCl_2$, being non-volatile, remains in the liquid flowing down through the column and is withdrawn from column 8 in an anhydrous condition, dissolved in the absolute alcohol, by means of line 11. It is preferable to provide sufficient excess alcohol in the lower section of column 8 and in line 11 to avoid any possibility of crystallization at these points.

In distillation column 8 the function of the reboiler coil 9 and the vapor-liquid contact in the lower portion of the column is to expel all water from the feed mixture, so as to make possible the withdrawal of an anhydrous alcohol solution as bottom product. As the water is vaporized and expelled from the feed mixture, there is inevitably a substantial vaporization of alcohol also, and the function of the upper section of the column and the reflux-condensing coil 10 is to prevent, as far as possible, the escape of alcohol with the water in the overhead vapors. It so happens that isoamyl and those alcohols which I prefer to employ in practising my invention all form constant-boiling mixtures with water; that is to say, in distilling mixtures of these alcohols with water, it is not possible to produce both anhydrous alcohol and alcohol-free water from any one alcohol-water mixture. If the mixture to be distilled contains more water (less alcohol) than the constant-boiling mixture, then it will not be possible to produce anhydrous alcohol as a product. The alcohol will be concentrated to the proportion in which it exists in the constant-boiling mixture, and the excess water will be produced as a bottom product, free from alcohol if the fractionation is sufficiently precise. If on the other hand the mixture contains less water (more alcohol) than the corresponding constant-boiling mixture, then anhydrous alcohol may be withdrawn as a bottom product and the constant-boiling mixture will be the top product, providing sufficiently precise fractionation is effected. Inasmuch as the latter situation necessarily must obtain in practising my invention, i. e., anhydrous alcohol must be one of the distillation products, it is necessary to add to the initial $MgCl_2$ solution that quantity of alcohol which will be distilled off with the water to be removed, in a constant-boiling mixture. Also, it is necessary to add alcohol in excess of the latter quantity, to act as a solvent for the anhydrous magnesium chloride and prevent it from being left as a solid when the water and the first quantity of alcohol are distilled off. Unless the column is provided with refluxing facilities, however, the overhead product will be richer in alcohol than the corresponding constant-boiling mixture, and hence a greater quantity of alcohol would in such an event have to be added to the feed. With the higher-boiling alcohols the excess which would be thus necessitated would not be great, and in any case the refluxing may be omitted if desired. If no reflux is used the feed is introduced into the top of the column, instead of at an intermediate point. It is understood, of course, that the column must contain a sufficient number of plates or the like if fractionation of excess alcohol from the top product is to be effected.

The overhead vapors from column 8 are passed through line 12 into line 13 and are cooled suitably to about 100° F. and liquefied in condenser 14, the condensate then being passed through line 15 to a settler or decanter 16. Isoamyl alcohol is soluble in water at 100° F. to an extent of about 2% by weight, and correspondingly water is soluble in isoamyl alcohol at 100° F. to the extent of about 10% by weight. Hence, in the decanter 16 there will be a separation of the condensate into two layers, the upper layer being mostly alcohol and the lower layer mostly water. As the water layer contains less than the constant boiling mixture proportion of alcohol, it is possible, as hereinbefore explained, to obtain from it by fractionation an alcohol-free water as a bottom product. The lower or water layer is withdrawn from decanter 16 through line 17 and rectified in redistillation column 18. Reboiler heat is supplied to column 18 by steam heated reboiler coil 19, the bottom temperature being substantially the boiling point of water, 212° F. The top of the redistillation column 18 again is maintained at 203° F., the boiling point of the constant boiling mixture of isoamyl alcohol and water, by means of reflux condensing coil 20. Vapors from column 18 pass through line 21 to be combined with vapors from column 8 in line 13 whence they travel in admixture one with the other to the condensation and decantation steps.

The upper layer of liquid in decanter 16 is withdrawn through line 2 and introduced into the previously mentioned feed line 1. Inasmuch as this layer will at 100° F. consist of a mixture of roughly 90% alcohol and 10% water, and the distillate vapors in column 8 will contain 42% water, each pound of alcohol supplied to column 8 from decanter 16 will be capable of carrying overhead about 0.6 pound of water in addition to that water which enters the column with it, assuming efficient fractionation. It is understood that the anhydrous isoamyl alcohol recovered from another stage in the process, as will be described later, and returned through line 3 supplies the proportion of alcohol necessary to act as a solvent for the anhydrous $MgCl_2$, and that the isoamyl alcohol as is recovered by decantation is in quantities sufficient for the removal of water from the aqueous feed. There are, therefore, two closed continuous alcohol cycles which supply a suitable proportion of alcohol to line 1 for the proper operation of this invention. Unavoidably small losses of alcohol from the system are made up by periodic additions.

The water removing capacity of the alcohol-rich liquid supplied to feed line 1 from decanter 16 is proportional therefore to the difference between the percent water in that liquid and the percent water in the constant-boiling mixture. The former figure is, as previously stated, approximately 10% at 100° F. for isoamyl alcohol while the latter figure for this alcohol is approximately 42%. It is seen then that the alcohol saturated with water from decanter 16 will have a water removing capacity not far below that of the absolute alcohol itself. It is entirely possible and within the scope of the invention to produce absolute alcohol from the upper layer in decanter 16 by a single extra stage of fractionation, the alcohol being obtained in such an event as a bottom product, and the constant-boiling mixture being obtained as a top product for condensation and return to decanter 16. Absolute alcohol so obtained then is introduced into the feed line 1 in lieu of the 90% alcohol employed in the described embodiment of the invention. In such a case a smaller total volume of liquid would have to be introduced and a smaller volume of vapors taken overhead.

Referring again to the anhydrous distillation residue removed from column 8 through line 11, this solution is contacted with ammonia gas which enters line 11 from lines 22 and 23 respectively. The ammonia is thoroughly intermixed with the distillation residue in line 11 and the intimately mixed mixture thereafter is cooled to substantially 100° F. in cooler 24 to precipitate solid particles of $MgCl_2.6NH_3$ complex from the isoamyl alcohol. The cooled material leaves cooler 24 through line 25 and enters the continuous filter 26 wherein the Mg-containing precipitate is separated from the alcohol. The filtrate removed by this operation, consisting of a solution of ammonia in alcohol, enters ammonia stripping column 28 at an intermediate point through line 27. Column 28 can be conventional in design, having a steam reboiler coil 29 located at the bottom and a water cooled reflux condensing coil 30 at the top. In column 28 the vapors of ammonia are conventionally stripped from the alcohol, for instance, by maintaining reboiler 29 substantially at the boiling point of the alcohol which in the present instance is about 267° F. and by keeping the top of column 28 at a temperature of about 120° F. by means of coil 30 to prevent the escape of alcohol with the overhead ammonia vapors. The vapors of ammonia pass out through line 22 to be combined with the anhydrous distillation residue solution from column 8 in line 11, as aforementioned. The stripped anhydrous alcohol without further reduction in temperature is recycled back through line 3 to line 1 for readmixture with additional quantities of the hydrous $MgCl_2$ feed, as previously described.

The solid $MgCl_2.6NH_3$ precipitate, removed on filter 26, is picked up immediately by screw feeder mechanism 31 and carried into surge drum 32 where a stream of hot ammonia vapors entering at the bottom from line 33 strips the solid $MgCl_2.6NH_3$ of residual traces of alcohol. The exit vapors from this treatment consisting of ammonia and alcohol leave surge drum 32 through line 23 for introduction into line 11, as heretofore described. The thus stripped particles of the $MgCl_2$-ammonia complex are picked up from the bottom of surge drum 32 by screw feeder mechanism 34 and discharged into a stream of ammonia gas introduced through line 43, and the suspension of the solid material in ammonia passes through line 35 into the fired heater 36. The hot ammonia vapors entering surge drum 32 may contain sufficient heat to partially decompose the $MgCl_2.6NH_3$ to a lower form of the $MgCl_2$-ammonia complex such as $MgCl_2.4NH_3$ or $MgCl_2.2NH_3$ with an accompanying liberation of ammonia. These products, however, also being solids, are likewise picked up by screw feeder mechanism 34 and charged to heater 36 along with the $MgCl_2.6NH_3$. In passing through heater 36 the temperature of the material passing therethrough is raised to a point ranging from about 700° to 900° F. and, upon being heated to an elevated temperature of this order, the complex breaks down progressively to $MgCl_2.4NH_3$, $MgCl_2.2NH_3$, $MgCl_2.NH_3$ and finally to pure $MgCl_2$ and pure $NH_3$. Thus by a simple heat treatment the complex is completely dissociated into pure anhydrous $MgCl_2$ and ammonia, without the occurrence of any undesirable side reactions.

The products of dissociation leave heater 36 through line 37 and pass into settler 38 wherein hot vapors of ammonia are evolved and pass out of the settler through line 39. A portion of these hot vapors of ammonia is diverted from line 39 through line 33 into the bottom of surge drum 32 wherein they serve as the alcohol stripping medium. The remainder of the ammonia vapors pass from line 39 into cooler 40 and in their passage therethrough are reduced to a temperature below 700° F. The cooled ammonia vapors from cooler 40 are then picked up by a blower 44 and recirculated through line 43 to the screw feeder 34 where they serve again as the carrier means for conveying additional quantities of the $MgCl_2$-ammonia complex through heater 36. The supply of pure anhydrous $MgCl_2$ which accumulates in the bottom of settler 38 is removed therefrom by screw conveyor mechanism 41 and disposed of as desired via product outlet line 42.

I claim:

1. A method of separating anhydrous magnesium chloride from a solution of anhydrous magnesium chloride in an anhydrous mono-hydroxy saturated aliphatic alcohol which comprises adding anhydrous ammonia thereto to precipitate an insoluble solid complex of magnesium chloride and ammonia from said solution and thereafter separating the anhydrous magnesium chloride from said complex.

2. A method as in claim 1 wherein said mono-hydroxy saturated alcohol is an isoamyl alcohol.

3. In a method of separating anhydrous magnesium chloride from its solution with an anhydrous mono-hydroxy saturated aliphatic alcohol the improvement which comprises adding anhydrous ammonia to said alcohol solution to precipitate an insoluble solid magnesium chloride-ammonia complex therefrom, separating said complex from said alcohol and thereafter heating the solid complex to remove the ammonia therefrom whereby the anhydrous magnesium chloride is recovered as the residue.

4. In a method of separating magnesium chloride from its solution with an anhydrous monohydroxy saturated aliphatic alcohol the improvement which comprises passing vapors of anhydrous ammonia through said solution to precipitate an insoluble solid complex of magnesium chloride and ammonia therefrom, separating said complex from said alcohol and thereafter heating the saturated complex to a temperature between 700 and 900° F. to recover anhydrous magnesium chloride therefrom.

5. In the method of preparing anhydrous magnesium chloride from hydrous forms thereof consisting of heating a hydrous form of magnesium chloride with a mono-hydroxy saturated aliphatic alcohol and distilling off all of the water in said hydrous material in admixture with vapors of said alcohol thereby forming as a distillate residue an anhydrous solution of magnesium chloride in said alcohol and then separating anhydrous magnesium chloride from said solution, the improvement which comprises mixing anhydrous ammonia with said distillate residue to precipitate therefrom an insoluble magnesium chloride-ammonia compound, removing the magnesium chloride-ammonia compound from its association with said alcohol and dissociating said compound into anhydrous magnesium chloride and ammonia to recover the magnesium chloride therefrom.

6. In the method of preparing anhydrous magnesium chloride from hydrous forms thereof consisting of heating a hydrous form of magnesium chloride with an isoamyl alcohol and distilling off all of the water in said hydrous material in admixture with vapors of said alcohol thereby forming as a distillate residue an anhydrous solution of magnesium chloride in said alcohol and then separating anhydrous magnesium chloride from said solution, the improvement which comprises mixing anhydrous ammonia with said distillate residue to precipitate therefrom an insoluble magnesium chloride-ammonia compound, removing the magnesium chloride - ammonia compound from its association with said alcohol and dissociating said compound into anhydrous magnesium chloride and ammonia to recover the magnesium chloride therefrom.

7. In a method of preparing anhydrous magnesium chloride from an aqueous magnesium chloride solution which comprises mixing said solution with a mono-hydroxy saturated aliphatic alcohol boiling above 220° F. and distilling off all water from the mixture together with a portion of the alcohol to form an anhydrous solution of magnesium chloride in alcohol and separating the magnesium chloride, the improvement which comprises passing vapors of ammonia into said alcohol solution to precipitate an insoluble solid complex of magnesium chloride and ammonia therefrom, separating said solid precipitate and then heating the separated precipitate to recover anhydrous magnesium chloride free from ammonia.

8. A method of separating anhydrous magnesium chloride from a solution of anhydrous magnesium chloride in an anhydrous monohydroxy saturated aliphatic alcohol which comprises adding anhydrous ammonia thereto to precipitate an insoluble solid complex of magnesium chloride and ammonia from said solution, separating said solid complex, blowing hot vapors of ammonia through the separated complex to drive off residual amounts of alcohol, conveying particles of the alcohol-free complex in a stream of ammonia vapors through a heated zone of restricted cross-sectional area to dissociate said particles into anhydrous magnesium chloride and ammonia, recovering anhydrous magnesium chloride from the products of dissociation and returning portions of the ammonia content of said products of dissociation to said drying and heating zones.

ARNOLD BELCHETZ.